United States Patent Office 3,658,876
Patented Apr. 25, 1972

3,658,876
PROCESS OF PREPARING L-α-ACETAMINO-α-VANILLYLPROPIONITRILE
Donald F. Reinhold and Meyer Sletzinger, North Plainfield, and John M. Chemerda, Watchung, N.J., assignors to Merck & Co. Inc., Rahway, N.J.
No Drawing. Division of application Ser. No. 642,272, Apr. 10, 1967, now Patent No. 3,505,385, which is a division of application Ser. No. 309,379, Sept. 19, 1963, now Patent No. 3,366,679, which in turn is a continuation-in-part of application Ser. No. 229,961, Oct. 11, 1962. This application July 9, 1969, Ser. No. 840,479
Int. Cl. C07c *121/02, 121/66*
U.S. Cl. 260—465 D
1 Claim

ABSTRACT OF THE DISCLOSURE

The process of forming L-α-acetamino-α-vanillyl-propionitrile from DL-α-amino-α-vanillylpropionitrile which comprises: (a) forming and isolating L-α-amino-α-vanillylpropionitrile-d-10-camphorsulfonate contaminated with a small amount of the corresponding Dd-salt by agitating a solution of DL-α-amino-α-vanillylpropionitrile with d-10-camphorsulfonic acid and separating said optically impure more soluble Ld-salt by agitating the resulting DL, d-salt mixture in 10 to 40 parts, by volume, of dioxane containing 0 to 10% water, by volume, per part by weight of said DL,1-salt mixture and separating the less soluble Dd-salt; and (b) converting said impure Ld-salt to pure L-lower alkanoylamino vanillylpropionitrile by heating said impure salt in a reaction mixture comprising a lower alkanoyl anhydride and pyridine to form the corresponding O,N-diacyl compound followed by basification of a solution of said O,N-diacyl compound with one equivalent of base selected from alkali metal hydroxide, alkali metal bicarbonate and ammonia in a hydroxylated solvent selected from water, lower alkanols and lower glycols to form said lower alkanoylaminonitrile contaminated with some D-enantiomorph and recrystallizing said impure nitrile from an inert solvent.

This application is a division of U.S. application on Ser. No. 642,272 filed Apr. 10, 1967 (now U.S. Pat. No. 3,505,385) which is a division of U.S. application Ser. No. 309,379, filed Sept. 19,1963 (now U.S. Pat. 3,366,-679) which in turn is a continuation-in-part of U.S. application Ser. No. 229,961, filed Oct. 11, 1962, now abandoned.

This invention relates to processes and intermediates for the preparation of optically-active lower alkyl-3,4-dihydroxyphenylalanines. More specifically, it relates to overall processes for the synthesis of L-α-lower alkyl 3,4-dihydroxyphenylalanine, especially the α-methyl compound without forming the D enantiomorph. More specifically also, it relates to key intermediates for the above over-all synthesis, namely, α-lower alkanoylamino-α-3,4-dimethoxy methoxyhydroxy or dihydroxybenzyl propio-butyro or valeronitriles, to processes for preparing such compounds and to processes for resolving them.

α-Methyl - 3,4 - dihydroxyphenylalanine or α-methylDOPA, as it is usually called, has been demonstrated to be a potent antihypertensive agent in man. The activity of this compound which like all amino acids possesses an asymmetric carbon is in the L-form. The D-form is completely inactive as an anti-hypertensive agent but is equally as toxic as the L-form. It is therefore important to get the L-form free of the D-form for use in medicine. Prior commercial syntheses of L-α-methylDOPA required that the resolution of the optical isomers be carried out at the end of the synthesis. This resulted in an accumulation of unusable D-form which is not readily or cheaply degraded to a step in the synthesis where it could be reused nor is it readily racemized. There is, therefore, an urgent need for an economical and practical synthesis of α-methylDOPA and its homologs which does not produce the unusable D-form.

The synthesis of α-lower alkyl DOPA's usually proceeds from lower alkyl vanillyl or veratryl ketone (or, to a lesser extent, from lower alkyl dihydroxy benzyl ketones) in one of two ways. Either the ketone is reacted with ammonium carbonate and a cyanide salt to form a hydantoin which upon hydrolysis delivers the corresponding α-lower alkyl methoxy hydroxy (or dimethoxy or dihydroxy) phenylalanine or the ketone is reacted with ammonium cyanide to form a α-amino-α-vanillyl (or veratryl or dihydroxybenzyl) propio, butyro or valeronitrile which can be hydrolyzed stepwise to the corresponding amide and then simultaneously demethylated and hydrolyzed to form the dihydroxyphenylalanine. The product of the ammonium cyanide reaction can be generically defined as an α-amino-α-substituted benzyl lower alkyl nitrile in which substituted benzyl may be vanillyl, veratryl or 3,4-dihydroxybenzyl and in which the lower alkyl nitrile chain has at least two carbons other than the CN. We have found that the L-form can be synthesized without the production and accumulation of D-form by running the resolution at the aminonitrile stage in the latter synthesis and thus the racemic aminonitriles are the starting materials in our process. We have further found that this resolution can be carried out by a direct crystallization of one enantiomorph form a solution of the racemate, if the said aminonitrile is converted to a lower alkanoylaminonitrile. We have further found that such a lower alkanoylaminonitrile can be prepared directly without o-acylation by heating the aminonitrile with a lower alkanoic anhydride with or without an inert solvent and in the absence of a tertiary base. We have further found that it is possible to resolve the free vanillyl aminotrile directly with 1-camphor-10-sulfonic acid and that this resolution also can be carried out with more readily available d-camphor-10-sulfonic acid with subsequent formation of the lower alkanoylaminonitrile.

No matter how the resolution is carried out, the starting racemic aminonitrile can be prepared from a lower alkyl vanillyl ketone. If the resoltuion is to be carried out by direct crystallization, a lower alkyl veratryl or dihydroxybenzyl ketone can be used instead. The ketone is condensed with ammonia and cyanide ion in any known manner to form the starting DL-α-amino-α-vanillyl (or veratryl or dihydroxybenzyl) propionitrile or higher alkanonitrile. This reaction can be run in any inert solvent. In the past it has been run in water using the bisulfite addition product of the ketone in order to achieve water solubility. The source of cyanide ions was any water-soluble salt such as ammonium, potassium or ammonium cyanide. We have found it also possible to run this reaction in lower alkanols such as isopropanol or in acetonitrile or lower alkyl ketones using ammonia and hydrogen cyanide as the reagent, in which case there is no need to form the bisulfite adduct in order to get solubility for the ketone. However, the preferred method is still the use of the bisulfite addition compound in water. The reaction proceeds faster as the temperature is raised. There is a great tendency however at higher temperature for hydrogen cyanide to be lost. It is, therefore, usually preferred to run this reaction below 25°. When using isopropanol it is possible to raise the temperature as high as 45° and when running the reaction in water, temperatures of even 75° are usable. If an autoclave is also used, the reaction can be run at much higher temperatures.

From the starting racemic α-amino-α-vanillyl-(veratryl or dihydroxybenzyl)propionitrile or higher alkanonitrile there are three possible routes which involve three separate resolution methods at this stage before continuing with the synthesis. These routes can be readily seen in the flow sheet which illustrates them with reference to α-methylDOPA. The higher α-alkyl DOPA's are similarly prepared. The reagents shown in the flow sheet are generally the preferred conditions.

For convenience, the notation used in these specifications designates the aminonitriles and their derivatives by their absolute configuration (i.e., by the capital letters D and L.) The resolving agent is referred to by its actual rotation (i.e., d or l). Thus, a DL–1 salt is a salt of the racemic aminonitrile with 1–10-camphor sulfonic acid.

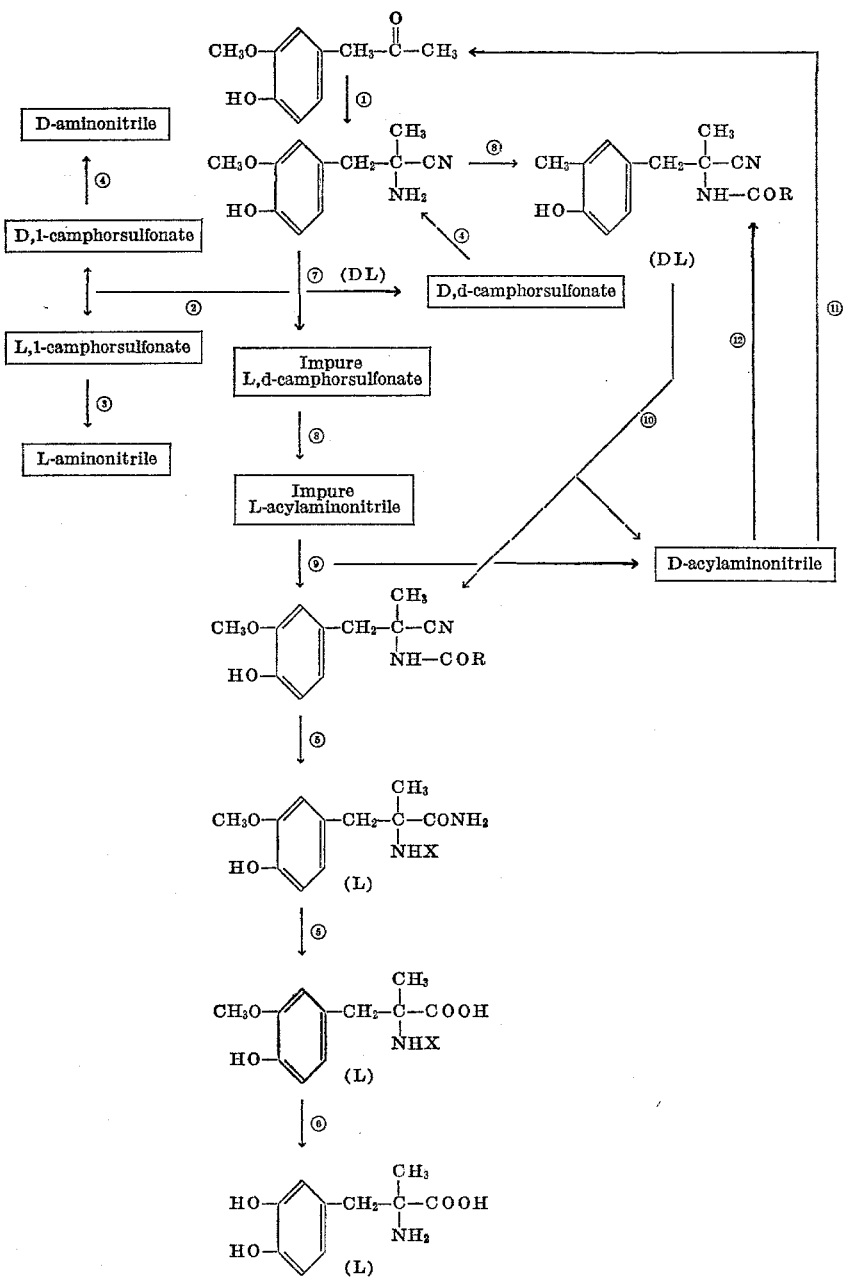

FLOW SHEET

REAGENTS

1. NH₃+HCN in isopropanol.
2. 1-10-camphorsulfonic acid in 1% aqueous dioxane.
3. Basification in non-racemizing solvent.
4. Basification in racemizing solvent.
5. Stirring cold with strong hydrohalic acid.
6. Heating over 100° with strong hydrohalic acid.
7. d-10-camphorsulfonic acid in 1% aqueous dioxane.
8. Alkanoic anhydride and heat, with or without solvent.
9. Recrystallization.
10. Seeding supersaturated solution in a lower alkanol such as ethanol or isopropanol or in acetonitrile or in a lower alkyl ketone with crystals of one enantiomorph.
11. Heating above 100° in alkanol with strong base.
12. Racemization by heating in a solvent such as dimethylsulfoxide with a base such as sodium cyanide or sodium hydride.
R = lower alkyl.
X = hydrogen and lower alkanoyl.

In the first resolution process the unnatural enantiomorph of 10-camphor sulfonic acid, namely, the l-enantiomorph, is used to resolve the aminonitrile directly. This resolution is carried out in dioxane. The 1–10 camphor sulfonic acid of the L-form of the aminonitrile is much less soluble than the D-aminonitrile. The separation occurs in dioxane or dioxane containing up to about 10% water, preferably no more than 2% water. The DL–1 salt can be formed in any solvent and the salt then can be placed in dioxane or aqueous dioxane for the separation. For example, it is particularly convenient to form the salt in pure dioxane and to add sufficient water to form the 1% aqueous dioxane, or the salt can be formed in 1% dioxane and either isolated or the separation run directly.

The formation of the 10-camphor sulfonate salt can be carried out at any temperature from ambient up to the boiling point of the solvent used. It is, however, to be recommended that high temperatures be avoided when water is present because of the chance of hydrolysis of the nitrile group. The Dl salt is much more soluble than the Ll salt. From 10 to 40 times the weight of the salt of the dioxane or aqueous dioxane should be used in the separation.

In order to decompose the Ll salt and recover the L-α-amino-α-vanillylpropionitrile, the salt is basified under non-racemizing conditions. By non-racemizing conditions is meant the use of solvents in which racemizing does not take place, the use of low temperatures to avoid promoting racemization, and speedy isolation of the aminonitrile. Racemizing solvents can be used if the latter precautions are observed to balance rate of neutralization against rate of racemization. Preferably, however, a non-racemizing solvent is used. Solvents such as dioxane, hydrocarbons and chlorinated hydrocarbons, acetonitrile, ethers and the like give the most stability and least solubiltiy of the ammonium camphor sulfonate and are therefore preferred. Ammonia is the usual base. Strong alkalis may promote racemization or decomposition.

The L-α-amino-α-vanillyl (or veratryl or dihydroxybenzyl)propionitrile so produced is then continued in the ordinary synthesis of α-lower alkyl DOPA's by carrying out the hydrolysis with halogen halides. The first hydrolysis to form the corresponding α-amino-α-vanillylpropionamide is preferably carried out between 15° and 40° although higher and lower temperatures can be used. Either hydrochloric acid or hydrobromic acid can be used. One can use any concentration of HBr or HCl above 6 or 8 normal, although the more concentrated acid solutions are preferred. The principal effect of using more concentrated acid is to speed up the reaction. Preferably, the amide is not isolated but is carried into the next step without isolation.

The next step in the synthesis is to hydrolyze the α-amino-α-vanillylpropionamide to the free amino acid and then to remove the methyl group from the methoxy on the benzene ring. The reaction can be stopped at the intermediate hydroxymethoxy (or dimethoxy) phenylalanine stage. Since the desired product is the dihydroxyphenylalanine or 1-a-methylDOPA, in normal practice the intermediate methoxyhydroxy (or dimethoxy) phenylamino acid shown in the flow sheet is not isolated.

The hydrolysis to L-α-methylDOPA is carried out by heating the propionamide produced above to a temperature above 100° C. with a concentrated hydrogen halide. Preferably, the reaction mixture is heated above 140° C. and even more preferably concentrated hydrochloric or hydrobromic acid can be used. Refluxing with concentrated (i.e., 48%) HBr gives a much faster reaction. For example, if the amino nitrile is reacted with two volumes of concentrated hydrochloric acid to give the corresponding amide and the mixture is then heated two hours at 150° ( in a clave), L-α-methylDOPA is obtained. However, by refluxing the propionamide with concentrated hydrobromic acid for a half an hour, good yields are obtained. The α-lower alkyl DOPA so produced is isolated by the usual techniques. It is especially advantageous to use ethyleneoxide to neutralize the hydrogen chloride or hydrogen bromide which is attached to the amino group since the chance of alkalizing the solution and thus forming a condition for instability is eliminated.

The Dl-camphor-sulfonate-salt which remains in solution in the 1% aqueous dioxane is decomposed by basification to form the free D-aminonitrile. This is then racemized in any racemizing solvent, that is, e.g., any hydroxylated solvent such as water, alcohols, glycols and the like. The basification can be carried out in any such solvent, if the Dl salt is first isolated from the dioxane mother liquor. Alternatievly, the basification can be carried out in the latter and the aminonitrile isolated for racemization. This newly formed racemic nitrile is then recycled to the formation of the camphor sulfonate salt. The racemic camphor sulfonate salt can be formed directly from the D-aminonitrile-l-camphor sulfonate by first isolating the latter and then basifying it in water with ammonium hydroxide, followed by acidification with hydrochloric acid. The camphor sulfonate salt of the rcaemic aminonitrile can then be charged directly into the separation stage.

Certain variations are also permissible in the isolation and recycling of the camphor sulfonic acid. Thus, the Ll salt can be hydrolyzed with hydrochloric acid to the propionamide stage or even to the hydroxy methoxy phenylalanine stage before the camphor sulfonic acid is separated. This is generally undesirable since it is more difficult to recover the camphor sulfonic acid.

The second method of resolution shown in the flow sheet uses the more common d-10-camphor sulfonic acid. The problem one encounters in the use of this reagent in resolving this aminonitrile is that the less soluble diastereomer is the Dd salt. When this is separated there remains a solution which is essentially the Ld salt but in impure form. The purification of this compound is carried out by converting the impure Ld salt to a lower alkanoyl aminopropionitrile. This is carried out by acylation with the alkanoic anhydride in pyridine, followed by cautious deacylation of the hydroxyl group. With the acylamino compounds it is possible to recrystallize to obtain pure acylaminonitrile. Since the acylamino compound is obtained from the Ld salt, its formation serves a dual purpose of also acting as the recovery step for the camphor sulfonic acid. Alternatively, however, it is possible to recover the free L-aminonitrile in impure form and then acylate but this introduces another stage. Recrystallization of the acylaminonitrile is usually carried out in isopropanol but other solvents such as acetonitrile, acetic acid, methanol, ethanol and similar solvents can be used.

The acylation can be carried out with any lower alkanoic anhydride, e.g., acetic, propionic, butyric and the like. Acetic is greatly to be preferred. When it is carried out upon the free aminonitrile as is described in the third resolution method, to be described later, the acylation can be carried out in one of two ways. When the camphorsulfonate is acylated, only the first method can be used. In the first acylation method, the alkanoic anhydride is used together with pyridine or other tertiary bases. There occurs in this method a complete acylation, i.e., the formation of an O,N-diacyl compound. The O-acyl group is then selectively removed by reaction with one mole of a base in water or alcohol or a similar hydroxylated solvent at room temperature. The base can be sodium hydroxide, potassium hydroxide, ammonia or even such a weak base as sodium bicarbonate.

The second and greatly preferred method of acylating α-amino-α-vanillylpropionitrile is to heat it with the alkanoic anhydride directly, alone or in the presence of solvent. Surprisingly, we have found that such a process selectively acylates the amino nitrogen without touching the free hydroxyl group. The solvents may be benzene, toluene, or any other solvent on which the rate of N-acylation is much faster than hydrolysis of the acylating agent, esterification of the solvent or racemization of the aminonitrile. Solvents which also meet these conditions are water and primary, secondary and tertiary alcohols such as ethanol, isopropanol, sec-butanol and tertiary butanol. This acylation can be carried out at temperatures from 0° up to the boiling point of the solvent, although 20–60° temperatures are preferred. It can also be carried out by heating the aminonitrile with an excess of the alkanoic anhydride up to the refluxing and then cooling. There is no need for prolonged heating as the product separates immediately upon formation, even separating during the heating up stage. Especially advantageous is formation of acylaminonitrile in the reaction mixture in which the aminonitrile is formed, without isolating the latter. This is advantageously carried out by forming the aminonitrile in a solvent such as acetonitrile or isopropanol, adding a higher boiling solvent which is inert to acetic anhydride, such as toluene, removing the lower boiling solvent by distilling, under reduced pressure, adding acetic anhydride to the toluene and heating the mixture to complete the acetylation reaction.

The DL-acylaminonitrile can be readily hydrolyzed to the corresponding DL-acylaminopropionamide which also may be separated into its enantiomorph by direct resolution in the the same manner as described below as the third method of over-all synthesis. Consequently, these amides also form an embodiment of this invention.

In this second route of over-all synthesis, the recycling of the D-aminonitrile is carried out principally by neutralizing the Dd salt, which precipitated from 1% aqueous dioxane in a racemizing solvent as defined before. After the free aminonitrile has been allowed to stand in a racemizing solvent, the racemic aminonitrile can then be recycled to the reaction of the aminonitrile with 1- or d-camphor sulfonic acid. The other recycling, which is of less importance, is the mixture of D and L acylaminonitrile remaining in the solvent after recrystallization of the impure L-acylaminonitrile. Deacylation always causes some further reaction setting up an equilibrium of the aminonitrile with cyanide and a ketimine. It is therefore preferable to convert the residual acylaminonitrile back to methyl vanillyl or veratryl ketone in order to get maximum recovery. This is done by heating above 100° with a strong base in a lower alkanol solvent, e.g., sodium methoxide can be used in methanol in an autoclave or sodium methoxide and butanol at the reflux can be used. The reaction mixture is treated with acid to give the ketone which is recovered and recycled to the ammonia-hydrogen cyanide condensation, to give the starting racemic aminonitrile.

Conversion to the ketone can be even more effectively carried out by the additional step of adding ferrous sulfate to the alkanol-base reaction mixture, after the heating above 100° C. has been carried out, and azeotropically distilling by-product water. By adding this step, very good recovery of ketone is possible.

It is possible to convert the D-acylamino nitrile to the racemic aminonitrile by reaction of the base in butanol and then neutralizing the basic sodium salt, omitting the acid, but the recovery of free aminonitrile is not as good as the recovery of ketone.

The third and greatly to be preferred method of resolving α-alkanoylamino-α-vinillyl veratryl or dihydroxy benzyl propionitrile or higher alkanonitrile is by direct crystallization from a solution of the corresponding racemic mixture. This method can also be used for the corresponding alkanoyl aminoveratryl- and alkanoyl aminodihydroxy benzyl propionitriles or higher alkanonitriles. This is greatly preferred because it permits a clean separation and a clean recovery of the undesirable enantiomorph for recycling and can be made into a continuous process. The method is based on the formation of the racemic alkanoyl aminonitriles and on the fact that such compounds form supersaturated solutions in organic solvents such as acetonitrile, lower alkanols such as isopropanol, ethanol and methanol, both pure and diluted with water, and in lower alkyl ketones such as methyl ethyl ketone or methyl isobutyl ketone. Although separation of the pure enantiomorph directly is the preferred method, any solvent which permits some enrichment of one enantiomorph could be used, since the enriched product can be recrystallized to give pure product, the remaining enantiomorph being recycled. Such a supersaturated solution is formed in one of several ways; one such is by forming a saturated solution at a slightly elevated temperature and cooling. Another is by evaporation of solvent from a saturated solution. A third is by neutralization of a salt of the phenolic hydroxyl when such is present. The preferred method is to cool a saturated solution until enough supersaturation occurs to permit one enantiomorph to be seeded out independent of the other. This point occurs when supersaturation amounting to about 4 g./liter of one enantiomorph (preferably 4 g.) has been reached. Beyond this point, there will occur spontaneous nucleation of both enantiomorphs which is only tolerable in batch operation at short residence time. Control of such supersaturation in a cooling method of forming it depends on the slope of the solubility curve in the solvent. With relative flat curves (such as found for isopropanol) wider temperature changes, sometimes over 10° C., can be used. On the other hand, when a solvent such as 95% alcohol is used, where the temperature solubility curve is steep, close control of the temperature change is needed and the temperature can be changed only 6–8° C. Also, in order to avoid nucleation, the residence time in the crystallizer in continuous operation is shortened as the temperature change which is used becomes larger.

The solvents in which supersaturation occurs, and therefore in which direct resolution can be carried out, are the inert lower organic liquid/solvents in which the racemic mixture has a solubility greater than 1 g. per liter. One class of these, the most important, is the lower alkanols, both pure and mixed with themselves or water. These include methanol (both anhydrous and diluted with up to 50% water), ethanol (from absolute down to about 50% water) isopropanol, secondary butyl alcohol and the like. Another class is the lower alkyl ketones such as acetone, methyl ethyl ketone and methyl isobutyl ketone. Another usable solvent is acetonitrile. Others include dioxane, and formamide. Any inert organic solvents dissolving at least one gram of the racemic mixture can be used but preferably lower organic solvents (i.e., up to about eight carbons) are preferred. The solvent most preferred because of availability as well as utility is 95% ethanol. The acylamino nitriles and their resolution and preparation are thus important aspects of our invention as well as the over-all process using these steps. The supersaturated solution formed by cooling a saturated solution can be seeded with one enantiomorph and this causes the crystallization of additional quantities of that enantiomorph leaving the other enantiomorph still in supersaturated solution. The seeding can be done in parallel with each enantiomorph on aliquot portions of the supersaturated solution and the mother liquors recycled, or the seeding can be carried out in series by taking the mother liquor from one crystallization and seeding with the other enantiomorph. In such a series operation, if desired, the mother liquor can be cooled further in order to increase the supersaturation of the second enantiomorph. The mother liquor from the second recrystallization can then be recycled.

The D-isomer recovered by this method is recycled by conversion to the racemic aminonitrile or to the ketone, as described above. Conversion to the amino nitrile is done under racemizing conditions in order to effect racemization of the D-form for recycling. Even more preferred is direct racemization of the acylamino nitrile by heating in a solvent such as dimethylsulfoxide using a basic catalyst such as sodium cyanide or hydride. This step produces racemic acylaminonitrile without chemical change. The racemizing basic catalysts usable in this step include any cyanide, carbonate or hydride of the alkali metals or the cyanide of any organic quaternary ammonium base such as tetra lower alkyl ammonium cyanides, alkyl aralkyl and aryl quaternary ammonium cyanides and quaternary ammonium resins in the form of their cyanides. Racemization occurs at varying temperatures but is much better above 100°, preferably at 140–190° C. and for short periods of time since reactions which consume product and cause coloring as well do not increase proportionately in rate with increase in temperature. The solvents usable for this racemization are preferably the liquid organic sulfoxides, especially dimethylsulfoxide. However, other solvents such as dimethylformamide are operable. The racemization is even effective in a melt of the acylaminonitrile, without added solvent.

In the seeding, at least 5% of the weight of the acylaminonitrile in solution is used in the form of crystals of the desired enantiomorph. Preferably, a much larger quantity (of the order of 300 g./liter) is used. The volume of the seed, the fineness of its subdivision and the time of exposure, all control the amount recovered. In addition also, the extent of supersaturation is a factor. The supersaturated solution can be seeded after it has been formed or the seed can be added to the saturated solution and the saturated solution cooled (or otherwise treated) to form the supersaturated solution in the presence of the seed.

The L-acylaminonitrile thus formed is converted by reaction with acid directly into $\alpha$-alkanoylamino-$\alpha$-vanillyl (or veratryl)propionamide as in the previous method and the conversion of this compound to the L-$\alpha$-methylDOPA proceeds as described above.

Our invention can be illustrated by the following examples:

EXAMPLE 1

DL-$\alpha$-amino-$\alpha$-vanillylpropionitrile

To a solution of 33.2 g. (1.95 M) of anhydrous ammonia in 850 ml. of isopropanol at 15° C. is added 350 g. (1.95 M) of vanillyl methyl ketone with agitation. The temperature at this point should not go below 15° C. or the adduct will crystallize from solution. To this solution is added over a 15-minute period with cooling, for the reaction is exothermic, 53 g. (1.95 M) of hydrogen cyanide. The temperature of the addition is between 15-25° C. The reaction is kept anhydrous and left to stir at 25° C. for 18 hours. During this period the product crystallized. After cooling to 0-5° C. the aminonitrile is filtered and washed twice with 100 ml. of cold isopropanol. The white product is dried in vacuo without heat. Yield: 374 g. (93.5%), M.P. 125.5–127° C.;

$\lambda_{max.}^{MeOH}$ 2800

E%=144; 2300, E%=325.

EXAMPLE 2

D,L-$\alpha$-amino-$\alpha$-vanillylpropionitrile 1–10-camphorsulfonate

To a solution of 96.0 g. of 1–10-camphorsulfonic acid in 250 ml. of water is added 80 g. of D,L-$\alpha$-amino-$\alpha$-vanillylpropionitrile. The mixture is heated to 40° C. to effect solution, cooled immediately to 10° C. and aged at 8–10° C. for two hours. The salt is filtered, washed with ice water and dried in vacuo over phosphorous pentoxide to constant weight. Weight 160.5 g. (94.5%).

$\lambda_{max.}^{MeOH}$ 2800, 2310

E%=67.8, 151; $[\alpha]546=-27.4°$ (C=2 MeOH).

EXAMPLE 3

L-$\alpha$-amino-$\alpha$-vanillylpropionitrile 1–10-camphorsulfonate (A) A suspension of 100 g. of D,L-$\alpha$-amino-$\alpha$-vanillylpropionitrile 1–10-camphorsulfonate in 4.5 ml. dioxane is stirred for 65 hours. The insoluble L1 salt is filtered, washed with a little dioxane and dried in vacuum at room temperature. Weight 45 g.

$\lambda_{max.}^{MeOH}$ 2800, 2310

E%=55.2, 125; $[\alpha]546=+19.5°$ (C=2 MeOH).

Analysis.—Calcd. for $C_{25}H_{38}N_2O_8S$ (percent): C, 57.01; H, 7.27; N, 5.31. Found (percent): C, 56.72; H, 7.25; N, 5.40. The purity of this diastereoisomer is 87% by phase solubility.

(B) The L1 salt is purified by stirring 4 g. in 90 ml. of 1% water in dioxane (v./v.) for 72 hours. The salt, after filtering, washing, and drying, weighs 2.84 g. and is now 98.5%±.5% pure by phase solubility; $[\alpha]546=+18.2°$ (C=1 MeOH).

(C) A suspension of 56.0 g. of D,L-$\alpha$-amino-$\alpha$-vanillyl propionitrile 1–10-camphorsulfonate is stirred for 72 hours in 1% aqueous dioxane (v./v.). The L1 salt is filtered, washed with dioxane and dried. Weight 15.7 g. $[\alpha]546=+18.5°$ (C=1 in MeOH). This salt is 95% pure by phase solubility.

(D) One gram of D,L-$\alpha$-amino-$\alpha$-vanillylpropionitrile in 12.5 ml. dioxane is added to 1.2 g. 1–10-camphorsulfonic acid in 10 ml. of 1% aqueous dioxane. The solution is seeded with pure L,1-salt and the mixture, after stirring for 24 hours is filtered. The L1 salt is washed with dioxane and dried over $P_2O_5$. Weight 950 mg. $[\alpha]546=-19.1°$. Phase solubility analysis indicates that the product is 91.5% pure.

EXAMPLE 4

L-$\alpha$-amino-$\alpha$-vanillylpropionitrile

Ammonia gas is slowly passed into a slurry of 400 mg. of L-$\alpha$-amino-$\alpha$-vanillylpropionitrile 1–10-camphorsulfonate in 10 ml. of anhydrous ether for 2.5 hours. The system is maintained under 25 mm. of mercury pressure. The ammonium 1–10-camphorsulfonate is filtered and the filtrate concentrated below 20° C. to afford substantially pure L-aminonitrile. Weight 169.6 mg. $[\alpha]546=+9.8°$. (C=1 dioxane), M.P. 85–88° C.

EXAMPLE 5

L-$\alpha$-acetamido-$\alpha$-vanillylpropionitrile (A) To 150 ml. of a cold 1:1 mixture of acetic anhydride-pyridine is added 30 g. of optically impure L-$\alpha$-amino-$\alpha$-vanillylpropionitrile d-10-camphorsulfonate, prepared in an analogous manner to Example 3. The solution is allowed to stand overnight and then poured into 500 ml. of ice water. The diacetate of the aminonitrile is extracted into methylene chloride, washed successively with water, 1 N hydrochloric acid, sodium bicarbonate solution and water. The solution is dried and concentrated to give 14.35 g. of diacetate $[\alpha]546=-22.6°$. (C=1 in MeOH.)

The diacetate (12.05 g.), which is 73% L and 27% D, is hydrolyzed to mono-acetate by dissolving in 75 ml. ethanol 2BA and adding an aqueous solution of 1.65 g. of sodium hydroxide. The solution is stirred at room temperature for 1.5 hours and then concentrated to a volume of 30 ml. The mixture is acidified with concentrated hydrochloric acid and cooled at 8° C. for two hours. Weight 9.5 g. $[\alpha]546=-21.9°$. (C=1 in MeOH.) Three recrystallizations from isopropanol gives an 80% recovery of pure L-$\alpha$-acetamido-$\alpha$-vanillylpropionitrile, M.P. 197–200°, $[\alpha]546=-49.1°$ (C=1 in MeOH).

EXAMPLE 6

L-$\alpha$-acetamide-$\alpha$-vanillylpropionitrile

The impure L,1–10-camphorsulfonate salt, $[\alpha]546=-18.2°$ (C=1 in MeOH), 400 mg., formed in Example 3, step (A) is added to a cold mixture of .5 ml. of pyridine and .5 ml. of acetic anhydride. The mixture is allowed to stand at room temperature for one hour and then is heated on the steam bath for five minutes. The solution is cooled and poured onto ice water. The diacetate of the aminonitrile is extracted into 5 ml. chloroform and the aqueous layer separated. The chloroform solution is washed successively twice with 5 ml. 2.5 N hydrochloric acid, water until neutral, and dried. Evaporation of the chloroform gives .213 g. of a glassy residue which, after crystallization from isopropanol-petroleum ether, weighs 169 mg. and melts at 120–123°, $[\alpha]546=-48.2°$ (C=1 in MeOH).

This diacetate can be hydrolyzed as described above in Example 5 to give pure L-$\alpha$-acetamido-$\alpha$-vanillylpropionitrile.

EXAMPLE 7

DL-α-acetamido-α-vanillylpropionitrile

To 1.0 g. of DL-α-amino-α-vanillylpropionitrile is added 1 ml. of acetic anhydride. The mixture is heated on the steambath for two minutes until solution is complete. The solution is cooled immediately in an ice bath and filtered. The wet cake is digested with 2 ml. of isopropanol, cooled and filtered. Weight 1.135 g. (96%), M.P. 179–182°.

When propionic anhydride or butyric anhydride is used in place of the acetic anhydride, the corresponding propionamido or butyramido nitrile is obtained.

EXAMPLE 8

L-α-acetamido-α-vanillylpropionitrile by direct resolution

One gram of DL-α-acetamido-α-vanillylpropionitrile is dissolved in 25 ml. of isopropanol. The solution is filtered and reheated to 40°. Finely powdered seeds (50 mg.) are slowly added with stirring. When the solution becomes turbid the remaining seeds are added at once. The mixture is stirred for an additional 5 minutes and filtered. The precipitate is washed with a little cold isopropanol and dried. Weight .300 g., $[\alpha]546 = -31°$ (C=1 in MeOH). Swishing this material in 13.3 grams isopropanol yields 189 mg. of pure L-α-acetamido-α-vanillylpropionitrile, $[\alpha]546 = -49°$ (C=1 in MeOH).

EXAMPLE 9

L-α-amino-α-vanillylpropionamide HCl

Hydrogen chloride is passed into 300 ml. of 37% hydrochloric acid at $-15°$ C. until 83 g. is dissolved. L-α-amino-α-vanillylpropionitrile (30.0 g.) is then slowly added and the mixture allowed to react at $-15°$ C. for 18 hours. The solution is concentrated to dryness and the residue flushed with two 30 ml. portions of t-butanol. The crystalline mass is slurried with 100 ml. of acetone, filtered and dried in vacuum. Weight 40.0 g. (105% of theory), K.F.=5.2%.

*Analysis.*—Calcd. for Cl (percent): 13.6. Found (percent): 13.2.

EXAMPLE 10

L-α-methylDOPA

A solution of 5.0 g. of the L-α-amino-α-vanillylpropionamide hydrochloride in 25 ml. of 48% hydrobromic acid is refluxed 16 hours. Paper strip analysis of a sample indicates that the reaction is essentially complete after .5 hour. The solution is concentrated to dryness. The residue is flushed twice with 25 ml. portions of t-butanol and then dissolved in 25 ml. acetone. The insoluble inorganic salts are removed by filtration. Addition of 1.56 ml. of propylene oxide to the acetone precipitates the α-methylDOPA which, after filtering and drying, weighs 3.4 g. (88.5%), M.P. 296–299°. U.V. $\lambda$max. 280, 220, E%=129, 297. $[\alpha]$ 546 Copper Salt=+151°.

EXAMPLE 11

Methyl vanillyl ketone from D-α-acetamido-α-vanillylpropionitrile

The D-α-acetamido-α-vanillylpropionitrile (1.16 g.) is dissolved in 15 ml. of 1 N sodium methoxide in methanol solution. The solution is sealed in a Carius tube and heated at 125° for 8 hours. The methanol is distilled in vacuo and the residue diluted with water. The mixture is extracted into chloroform. The chloroform solution is washed successively with water and sodium bicarbonate solution, then dried and concentrated to give .72 gram (80%) of an oil. V.P.C. analysis indicated that 98.8% of the volatile material has the same retention time as authentic ketone. The I.R. spectrum also was identical to the reference sample. U.V. $\lambda$max. 2820, 280, E% 169, 321.

EXAMPLE 12

Hydrolysis of D-α-acetamido-α-vanillylpropionitrile to DL-α-amino-α-vanillylpropionitrile A mixture of 12.41 g. of D-α-acetamido-α-vanillylpropionitrile and 5.94 g. of sodium methoxide in 55 ml. of dry n-butanol is refluxed in a nitrogen atmosphere for 5 hours. During this period 25 ml. of n-butanol is distilled from the reaction. To the cooled mixture is added 20 ml. of concentrated ammonium hydroxide and 5.89 g. of ammonium chloride. The mixture is stirred for 18 hours and then cooled in an ice bath. The precipitate is filtered, washed with cold water and cold isopropanol and dried. The DL-α-amino-α-vanillylpropionitrile weighs 6.32 g. and melts at 120–123°.

EXAMPLE 13

Hydrolysis of D-α-acetamido-α-vanillylpropionitrile to methyl vanillyl ketone A mixture of 24.89 g. of D-α-acetamido-α-vanillylpropionitrile, 11.89 g. of sodium methoxide in 120 ml. of n-butanol is heated for 5 hours. A total of 60 ml. of distillate is collected during this period. After cooling to room temperature, the mixture is added to 20 ml. of water. Acetic acid (67 ml.) is added and the mixture heated at 60–85° for 1.5 hours. The pH is adjusted to 4 with 26 ml. of concentrated hydrochloric acid. The cold solution is then extracted five times with 100 ml. portions of methylene chloride. The methylene chloride is evaporated in the hood to remove hydrogen cyanide and the residue redissolved in 250 ml. of methylene chloride. The methylene chloride solution is washed with sodium bicarbonate solution and water, dried and concentrated to yield an oil. Distillation of an aliquot at 120–127°/.85 mm. gives 90.1% of pure methyl vanillyl ketone.

EXAMPLE 14

L-α-acetamido-α-veratrylpropionitrile

The procedure of Example 1 is followed using an equivalent amount of methyl veratryl ketone in place of the methyl vanillyl ketone. The DL-α-amino-α-veratryl propionitrile thus formed is converted to the acetylamino veratryl propionitrile by the method of Example 7. The method of Example 5(A) can also be used since there is no ring hydroxyl to complicate the acetylation. When DL-α-acetamino-α-veratryl propionitrile is used in the procedure of Example 8, L-α-acetamido-α-veratryl propionitrile is obtained.

When these procedures are used, starting with methyl 3,4-dihydroxybenzyl ketone, similarly the corresponding α-dihydroxyphenyl-α-acetamino-propionitrile is obtained.

EXAMPLE 15

DL-α-acetamido-α-vanillylpropionitrile directly from methyl vanillyl ketone

To a cooled (10°) solution of ammonia in 10 ml. of acetonitrile is added 3.6 g. of methyl vanillyl ketone followed by 0.9 ml. of hydrogen cyanide. The flask is stoppered and allowed to stand at room temperature for 48 hours. The aminonitrile thus formed is acetylated without isolation by adding 15 ml. of toluene, distilling the acetonitrile under reduced pressure to a reaction mixture volume of 15 ml. of adding 4 ml. of acetic anhydride. The mixture is then heated to reflux and cooled. N-acetyl aminonitrile crystallizes and is isolated by filtration at 5° C., washed with toluene and dried.

Yield: 4.3 g. Melting point 175–177° C.

$\lambda_{max.}^{CH_3OH}$ 2810 (122), 2310 (301)

EXAMPLE 16

Methyl vanillyl ketone from D-α-acetamido α-vanillylpropionitrile by ferrous sulfate oxidation A 250 ml. of 3-necked R.B. flask equipped with stirrer and condenser is charged with 70 ml. n-butanol. For drying, 15 ml. is distilled out, and 12.41 g. (0.05 mole) N-acetyl compound, and 5.94 g. (0.11 mole) fresh commercial sodium methoxide are added. The reaction is refluxed under nitrogen for five hours, while slowly distilling out 30 ml. to remove methanol and raise the boiling point.

After the mixture is cooled, a solution of 2.37 g. (0.0085 mole, a 2% excess) $FeSO_4 7H_2O$ in 100 ml. water is added. The butanol-water azeotrope is distilled out through a 4″ helix-packed column to 99° (40 minutes), carrying over 16 ml. water and 27 ml. butanol. The cooled residual solution is acidified to pH of 4–6 with ca. 1.7 ml. concentrated sulfuric acid (2.93 ml. required for 0.11 mole of protons) and extracted four times with 20 ml. toluene.

Evaporation of the toluene yields 9.03 g. crude ketone of which, on quantitative microdistillation, 0.155 g. yields 0.1451 g. pure ketone, for an over-all yield of 93.6%.

EXAMPLE 17

DL-α-acetamino-α-vanillyl propionamide

The procedure of Example 9 is followed using DL-α-acetamino-α-vanillyl propionitrile instead of the amino nitrile. The product is DL-α-acetamino-α-vanillylpropionamide.

When DL-α-acetamino-α-veratryl propionitrile is similarly treated, the corresponding DL-α-acetamino-α-veratrylpropionamide is formed.

EXAMPLE 18

Direct resolution of DL-α-acetamino-α-vanillylpropionitrile by batch operation

A saturated solution is prepared by slurrying an excess of DL-α-acetamido-α-vanillylpropionitrile and a solvent at the given temperature of crystallization. The solution is then filtered and to the filtrate is added more recemate to the amount of supersaturation desired. The mixture is then heated to complete solution and recooled to the given temperature to give a supersaturated solution of known supersaturation. Seed of the L-isomer is then added and the mixture is agitated at the given temperature for one to three hours. The solid product is isolated by filtration and dried without washing. The results with various solvents are as follows:

| No. | Solvent | Temperature, °C. | Supersaturation, g./L | Seed, g./L | Net product, g./L | Optical purity, percent |
| --- | --- | --- | --- | --- | --- | --- |
| 1 | Methanol | 0 | 14 | 4.7 | 4.9 | 99 |
| 2 | 80% methanol-water | 25–30 | 8 | 4.8 | 3.0 | 99 |
| 3 | 50% methanol-isopropanol | 25–30 | 10 | 7.1 | 4.1 | 99 |
| 4 | 95% ethanol | 25–30 | 10 | 8.5 | 3.4 | 99 |
| 5 | Acetone | 25–30 | 12 | 5.4 | 5.4 | 96 |
| 6 | Methyl ethyl ketone | 25–30 | 12 | 5.1 | 5.6 | 100 |
| 7 | Methyl isobutyl ketone | 25–30 | 12 | 5.6 | 3.1 | 100 |
| 8 | Dioxane | 25–30 | 15 | 5.3 | 4.1 | 98 |
| 9 | Formamide | 25–30 | 12 | 8.9 | 5.8 | 97 |

EXAMPLE 19

Continuous direct resolution of DL-α-acetamido-α-vanillylpropionitrile in acetonitrile The apparatus consists of three vessels, each equipped with a stirrer and a means of temperature control. The three vessels are connected in a circle by delivery lines, each of which begins in an internal filter and passes through a pump to the next vessel. The first vessel in the circuit, the dissolver, is further equipped for the addition of racemate solids and solvents. The other two vessels are the D and L crystallizers, respectively. The operation of the equipment is as follows. Two liters of acetonitrile containing some DL-α-acetamido-α-vanillylpropionitrile are charged to the dissolver and agitation is begun. Sixty-nine gms. of DL-α-acetamido-α-vanillylpropionitrile are added to the dissolver and the temperature is adjusted to 35° C. After one hour solution is withdrawn and delivered to the D crystallizer at 20 cc./min. Filtrate in the crystallizer is maintained at 35–40° C. Acetonitrile is added intermittently to the dissolver to maintain the level. Solid DL subject is added to the dissolver as required to maintain the solid phase. When the D crystallizer contains 0.6 liters of solution flow to the L crystallizer is begun and the flow rate adjusted to 20 cc./min. The filtrate in the L crystallizer is also maintained at 35–40° C. When the L crystallizer contains 0.6 liters of filtrate, recycle back to the dissolver at 20 cc./min. is started.

After 20 minutes of pumping from vessel to vessel the crystallizers are cooled to 26° C. Eighteen gms. of D isomer are added to the D crystallizer and 18 gms. of L isomer are added to the L crystallizer. After five hours of crystallizing, the products in each crystallizer are isolated by filtration, washed with 2× 15 cc. cold acetonitrile and dried in vacuo.

The gross products weight 33.5 and 30.3 gms. (D and L respectively) and are greater than 95% optically pure. The productivities are 5.2 and 4.4 gms./hour/liter (600 ml. crystallizing volume) for the D and L respectively.

EXAMPLE 20

Racemization of D-α-acetamido-α-vanillylpropionitrile

A slurry of 10 g. of D-α-acetamido-α-vanillylpropionitrile and 100 mg. of sodium cyanide in 4 ml. of dimethyl sulfoxide is purged with nitrogen. The stirred mixture is heated rapidly to reflux (over 1 minute) and held at reflux 3 minutes. All solids dissolve and a pale yellow solution results. The mixture is then cooled quickly to 60–70° C. by an ice bath (about 1 minute). Dimethylsulfoxide is removed in vacuo at 60–70° C. for 1–2 minutes. The brown viscous syrup is quenched by the addition of 10 ml. of 0.6 N HCl at 0° with stirring, keeping temperature at 5–10° C. Care is needed here because of the liberation of HCN. The mixture is stirred at 5° C. for 30 minutes, until the product crystallizes. It is isolated by filtration and successive washing twice with 1 ml. of water and twice with 0.5 ml. of cold secondary butanol. There is obtained 916 mg. of DL-α-acetamido-α-vanillylpropionitrile, M.P. 171–176° C., 96–97% pure. This can be purified by dissolving it in hot aqueous secondary butanol, treating the solution with charcoal, cooling to induce crystallization and filtering.

We claim:

1. The process of forming L-α-acetamino-α-vanillylpropionitrile from DL-α-amino-α-vanillylpropionitrile which comprises:
    (a) forming an isolating L-α-amino-α-vanillylpropionitrile-d-10-camphorsulfonate contaminated with a small amount of the corresponding Dd-salt by agitating a solution of DL-α-amino-α-vanillylpropionitrile with d-10-camphorsulfonic acid and separating said optically impure more soluble Ld-salt by agitating the resulting DL,d-salt mixture in 10 to 40 parts, by volume, of dioxane containing 0 to 10% water, by volume, per part by weight of said DL,1-salt mixture and separating the less soluble Dd-salt; and
    (b) converting said impure LD-salt to pure L-lower alkanoylamino vanillylpropionitrile by heating said impure salt in a reaction mixture comprising a lower alkanoyl anhydride and pyridine to form the corresponding O,N-diacyl compound followed by basification of a solution of said O,N-diacyl compound with one equivalent of base selected from alkali metal hydroxide, alkali metal bicarbonate and ammonia in a hydroxylated solvent selected from water, lower alkanols and lower glycols to form said lower alkanoylaminonitrile contaminated with some D-enantiomorph and recrystallizing said impure nitrile from an inert organic solvent.

References Cited

UNITED STATES PATENTS

| | | | |
|---|---|---|---|
| 2,766,286 | 10/1956 | D'Amato et al. | 260—570.6 |
| 2,841,609 | 7/1958 | Larsen et al. | 260—465 |
| 3,366,679 | 1/1968 | Reinhold et al. | 260—465 X |
| 3,405,159 | 10/1968 | Krieger et al. | 260—465 |
| 3,408,385 | 10/1968 | Taub | 260—465 X |
| 3,466,315 | 9/1969 | Firestone et al. | 260—465 |
| 3,480,670 | 11/1969 | Reinhold et al. | 260—465 X |
| 3,505,385 | 4/1970 | Reinhold et al. | 260—465 |
| 2,727,063 | 12/1955 | Jacob et al. | 260—570.6 X |
| 2,742,500 | 4/1956 | Gregory et al. | 260—570.6 |
| 2,776,993 | 1/1957 | Alles | 260—570.6 |
| 2,794,025 | 5/1957 | Amiard et al. | 260—570.6 X |
| 2,848,494 | 8/1958 | Alberti et al. | 260—570.6 X |
| 3,312,733 | 4/1967 | Howe | 260—570.6 X |

FLOYD D. HIGEL, Primary Examiner

U.S. Cl. X.R.

260—465 E, 471 A, 559 R, 592